United States Patent
Luo (10) Patent No.: US 8,965,383 B2
(45) Date of Patent: Feb. 24, 2015

(54) LOAD BALANCING METHOD AND DEVICE

(71) Applicant: China Mobile Communications Corporation, Beijing (CN)

(72) Inventor: Haiyun Luo, Sunnyvale, CA (US)

(73) Assignee: China Mobile Communications Corporation, Beijing (CN)

( * ) Notice: Subject to any disclaimer, the term of this patent is extended or adjusted under 35 U.S.C. 154(b) by 86 days.

(21) Appl. No.: 13/687,368

(22) Filed: Nov. 28, 2012

(65) Prior Publication Data

US 2014/0148175 A1     May 29, 2014

(51) Int. Cl.
*H04W 74/00*     (2009.01)
*H04W 28/08*     (2009.01)

(52) U.S. Cl.
CPC .................................... *H04W 28/08* (2013.01)
USPC ...... 455/445; 455/455.2; 455/453; 455/550.1; 455/561; 370/329; 370/338; 370/389; 714/752; 714/746; 714/799

(58) Field of Classification Search
CPC ..... H04W 74/00; H04W 40/00; H04W 72/00; H04W 28/08; H03M 13/00; H04L 1/00
USPC ........ 455/450, 452.1, 522, 67.11, 226.1, 403, 455/414.1, 445; 370/338, 329, 235, 351, 370/344, 342, 389, 208, 335, 320, 535, 370/315; 375/260; 714/752
See application file for complete search history.

(56) References Cited

U.S. PATENT DOCUMENTS

2009/0110089 A1*   4/2009   Green ........................... 375/260
2013/0246880 A1*   9/2013   Ng et al. ....................... 714/752

* cited by examiner

*Primary Examiner* — Babar Sarwar
(74) *Attorney, Agent, or Firm* — Kilpatrick Townsend & Stockton LLP (57) ABSTRACT

A load balancing method and device are provided by the present invention. The method includes that: for each base station, determining the number of shared mobile hosts shared by the base station with each neighbor base station of the base station and the number of fixed mobile hosts covered only by the base station; ranking all of base stations in an ascending order of the number of fixed mobile hosts; and balancing the number of fixed mobile hosts of each base station by applying a greedy algorithm on the ranked base stations. With the present invention, the load can be efficiently balanced by exploiting the global knowledge.

4 Claims, 7 Drawing Sheets

|   | U1 | U2 | U3 | U4 | U_dummy |
|---|---|---|---|---|---|
| A1 | 1 | 1 | $\infty$ | 1 | 0 |
| A2 | 2 | 2 | $\infty$ | 2 | 0 |
| B1 | $\infty$ | 1 | 1 | $\infty$ | 0 |
| B2 | $\infty$ | 2 | 2 | $\infty$ | 0 |
| C1 | $\infty$ | $\infty$ | $\infty$ | 1 | 0 |

Fig. 11b

|     | U1 | U2 | U3 | U4 | U_dummy |
|-----|----|----|----|----|---------|
| A1  | 0  | 0  | ∞  | 0  | 0       |
| A2  | 1  | 1  | ∞  | 1  | 0       |
| B1  | ∞  | 0  | 0  | ∞  | 0       |
| B2  | ∞  | 1  | 1  | ∞  | 0       |
| C1  | ∞  | ∞  | ∞  | 0  | 0       |

Fig. 12

|     | U1 | U2 | U3 | U4 | U_dummy |
|-----|----|----|----|----|---------|
| A1  | 0  | 0  | ∞  | 0  | 0       |
| A2  | 1  | 1  | ∞  | 1  | 0       |
| B1  | ∞  | 0  | 0  | ∞  | 0       |
| B2  | ∞  | 1  | 1  | ∞  | 0       |
| C1  | ∞  | ∞  | ∞  | 0  | 0       |

Fig. 13

|     | U1 | U2 | U3 | U4 | U_dummy |
|-----|----|----|----|----|---------|
| A1  | 0  | 0  | ∞  | 1  | 1       |
| A2  | 0  | 0  | ∞  | 1  | 0       |
| B1  | ∞  | 0  | 0  | ∞  | 1       |
| B2  | ∞  | 0  | 0  | ∞  | 0       |
| C1  | ∞  | ∞  | ∞  | 0  | 0       |

Fig. 14

|     | U1 | U2 | U3 | U4 | Udummy |
| --- | --- | --- | --- | --- | --- |
| A1  | 1  | 0  | 0  | 0  | 0 |
| A2  | 0  | 1  | 0  | 0  | 0 |
| B1  | 0  | 0  | 1  | 0  | 0 |
| B2  | 0  | 0  | 0  | 0  | 1 |
| C1  | 0  | 0  | 0  | 1  | 0 |

|     | U1 | U2 | U3 | U4 | Udummy |
| --- | --- | --- | --- | --- | --- |
| A1  | 1  | 0  | 0  | 0  | 0 |
| A2  | 0  | 0  | 0  | 0  | 1 |
| B1  | 0  | 1  | 0  | 0  | 0 |
| B2  | 0  | 0  | 1  | 0  | 0 |
| C1  | 0  | 0  | 0  | 1  | 0 |

LOAD BALANCING METHOD AND DEVICE

FIELD OF THE INVENTION

The present invention relates to the field of communications and particularly to a load balancing method and device.

BACKGROUND OF THE INVENTION

In the mobile networks, the traffic load is non-uniformly distributed. Some geographical areas in the peak hour will have unusually high traffic density which will suffer from negative impacts such as high amount of blocked calls, high packet dropping rate, etc. It's important for the network operator to address such problem to keep the network performance in every area at a satisfactory level. The main method is load balancing, which migrates the load of hot-spot base station to other less congested base stations. Considering the large amount of base stations and different traffic load in different base stations, an efficient load balancing scheme is needed for the cellular network to avoid local congestion and to provide better quality of service in every area, in order to increase system performance. Previous studies use different technologies, such as cell-breathing, channel borrowing or dynamic scheduling, to address the load balancing problem.

Existing solutions, including cell-breathing, channel borrowing, or dynamic scheduling, mostly focused on local optimization problem which only takes the neighbor base stations into consideration when making the load-balancing decision. The main reason is that considering the current network architecture, the network control unit only has a limited knowledge of local network which could only support locally distributed load balancing schemes. However, as it can be seen from real traffic traces and the probability that the neighbor base stations also suffering excessive load is high, the efficiency of such efforts is greatly reduced. This situation now can change thanks to newly proposed Cloud-Radio Access Network (C-RAN) architecture.

C-RAN is a centralized processing, cooperative radio, and Cloud infrastructure Radio Access Network. The main architecture of C-RAN is composed of a distributed radio network with Remote Radio Heads, a centralized BaseBand Unit (BBU) pool using virtualization technology and a network connecting these two parts. All the BBUs and other site control equipments are aggregated in a centralized place in C-RAN's architecture, which provides a great convenience for sharing information between base stations and for centralized network management. For load balancing problem, such aggregation feature provides an important opportunity for centralized global load balancing which balance the load exploiting the whole network load knowledge, i.e., the global knowledge.

Therefore, there is a need for an efficient load balancing method for the C-RAN.

SUMMARY OF THE INVENTION

In view of this, the invention provides a load balancing method and device for the C-RAN, so that the load can be efficiently balanced by exploiting the global knowledge.

Technical solutions of the invention are embodied as follows.

There is a load balancing method including:

for each base station, determining the number of shared mobile hosts shared by the base station with each neighbor base station of the base station and the number of fixed mobile hosts covered only by the base station;

ranking all of base stations in an ascending order of the number of fixed mobile hosts; and balancing the number of fixed mobile hosts of each base station by applying a greedy algorithm on the ranked base stations.

There is a load balancing device including:

a determining module, configured, for each base station, to determine the number of shared mobile hosts shared by the base station with each neighbor base station of the base station and the number of fixed mobile hosts covered only by the base station;

a ranking module, configured to rank all of base stations in an ascending order of the number of fixed mobile hosts; and a balancing module, configured to balance the number of fixed mobile hosts of each base station by applying a greedy algorithm on the ranked base stations.

In the embodiments of the invention, for each base station, the number of shared mobile hosts shared by the base station with each neighbor base station of the base station and the number of fixed mobile hosts covered only by the base station are determined, all of base stations are ranked in an ascending order of the number of fixed mobile hosts, and the number of fixed mobile hosts of each base station is balanced by applying a greedy algorithm on the ranked base stations, so that the load can be efficiently balanced by exploiting the global knowledge.

There is another load balancing method including:

constructing a bipartite graph for mobile hosts and capacity slots of base stations, wherein the number of capacity slots of a base station is equal to the number of mobile hosts the base station can support, and in the bipartite graph, there is a line between a mobile host and every capacity slot of a base station covering the mobile host;

setting a weight for each line in the bipartite graph, wherein all lines from the same capacity slot have the same weight, and for one base station, lines from capacity slots of the one base station have weights in an ascending order;

converting the bipartite graph into a cost matrix, wherein in the cost matrix, rows and columns represent capacity slots and mobile hosts, respectively, the number of the rows is equal to the number of the columns, and each entry represents a weight between a capacity slot and a mobile host; and matching each mobile host with one capacity slot by applying a Hungarian algorithm on the cost matrix.

There is another load balancing device including:

a constructing module, configured to construct a bipartite graph for mobile hosts and capacity slots of base stations, wherein the number of capacity slots of a base station is equal to the number of mobile hosts the base station can support, and in the bipartite graph, there is a line between a mobile host and every capacity slot of a base station covering the mobile host;

a setting module, configured to set a weight for each line in the bipartite graph, wherein all lines from the same capacity slot have the same weight, and for one base station, lines from capacity slots of the one base station have weights in an ascending order;

a converting module, configured to convert the bipartite graph into a cost matrix, wherein in the cost matrix, rows and columns represent capacity slots and mobile hosts, respectively, the number of the rows is equal to the number of the columns, and each entry represents a weight between a capacity slot and a mobile host; and a matching module, configured to match each mobile host with one capacity slot by applying a Hungarian algorithm on the cost matrix.

In the embodiments of the invention, a bipartite graph is constructed for mobile hosts and capacity slots of base stations, wherein the number of capacity slots of a base station is equal to the number of mobile hosts the base station can support, and in the bipartite graph, there is a line between a mobile host and every capacity slot of a base station covering the mobile host, a weight is set for each line in the bipartite graph, wherein all lines from the same capacity slot have the same weight, and for one base station, lines from capacity slots of the one base station have weights in an ascending order, the bipartite graph is converted into a cost matrix, wherein in the cost matrix, rows and columns represent capacity slots and mobile hosts, respectively, the number of the rows is equal to the number of the columns, and each entry represents a weight between a capacity slot and a mobile host, and each mobile host is matched with one capacity slot by applying a Hungarian algorithm on the cost matrix, so that the load can be efficiently balanced by exploiting the global knowledge.

DETAILED DESCRIPTION OF THE EMBODIMENTS

With the global knowledge, the load balancing problem can be defined as follows. Given a cellular network which consists of a number of Mobile Hosts (MHs) and Base Stations (BSes), each MH can be assigned to only one base station to get a service. Due to the coverage of a BS as a constraint, the MH can only be assigned to a BS whose coverage covers the MH's location. The goal of load balancing is to find an assignment scheme for all base stations and mobile hosts so that the number of MHs served by each BS is as equal as possible.

To reach that goal, an embodiment of the invention starts from a very simple network model and tries to use greedy algorithm and later on, another embodiment of the invention models the whole network into a novel bipartite graph model and converts the load balancing problem into a min-weight max matching problem which can be solved in polynomial time.

Figure 1:
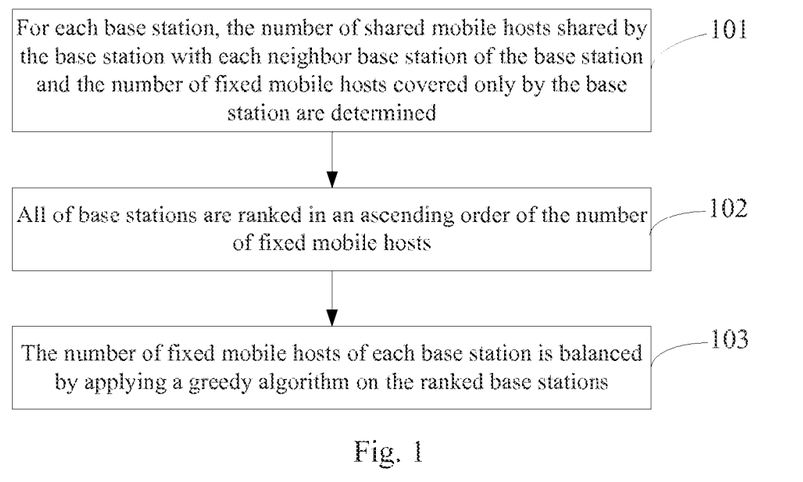
FIG. 1 is a flow chart of a load balancing method according to an embodiment of the invention.

An embodiment of the invention provides a load balancing method, as illustrated in FIG. 1, the load balancing method includes the following steps.

Step 101. For each base station, the number of shared mobile hosts shared by the base station with each neighbor base station of the base station and the number of fixed mobile hosts covered only by the base station are determined.

Step 102. All of base stations are ranked in an ascending order of the number of fixed mobile hosts.

Step 103. The number of fixed mobile hosts of each base station is balanced by applying a greedy algorithm on the ranked base stations.

In an implementation, for each base station, a box model may include an identifier of the base station, the number of shared mobile hosts shared by the base station with each neighbor base station and the number of fixed mobile hosts covered only by the base station.

In an implementation, step 103 may include: for any one base station of the ranked base stations, it is determined whether the number of fixed mobile hosts of the one base station is equal to that of the next base station of the ranked base stations; and if the number of fixed mobile hosts of the one base station is less than that of the next base station of the ranked base stations, a part of the shared mobile hosts shared by the one base station with each neighbor base station of the one base station are adjusted to be fixed mobile hosts of the one base station until the number of fixed mobile hosts of the one base station is no longer the minimal in the ranked base stations; or if the number of fixed mobile hosts of the one base station is equal to that of the next base station of the ranked base stations, a base station with the less number of shared mobile hosts is chosen between the one base station and the next base station of the ranked base stations, and a part of the shared mobile hosts shared by the chosen base station with each neighbor base station of the chosen base station are adjusted to be fixed mobile hosts of the chosen base station until the number of fixed mobile hosts of the chosen base station is no longer the minimal in the ranked base stations.

In an implementation, step 103 may include: a plurality of iterations of the greedy algorithm are applied on the ranked base stations to reach a predetermined standard deviation.

The above embodiment of the invention will be described in detail by taking some examples below.

1. One-Dimension Box Model and Greedy Approach

Figure 2:
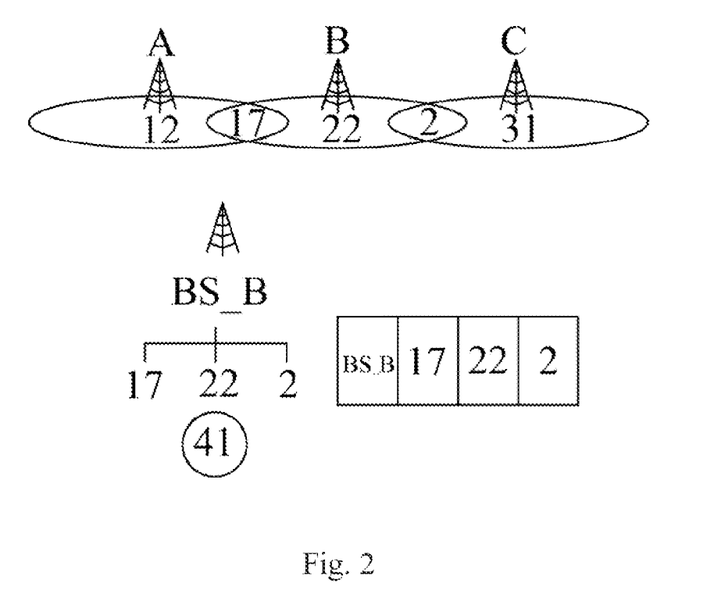
FIG. 2 illustrates a box model showing three base stations according to an embodiment of the invention.

In order to solve the load balance problem with the global knowledge, a model and methods based on core assumptions need to be built. For convenience, a "box" model illustrated in FIG. 2 is chosen to represent a BS. FIG. 2 illustrates a box model showing three BSes (BS_A, BS_B, BS_C), the numbers 17 and 2 represent MHs of BS_B within the shared ranges of BS_A and BS_C whereas 22 represents MHs within only BS_B's range. "41" is the total number of MHs currently within the range of BS_B. With the box model, it is possible to use a node structure to represent a BS's identifier (ID), shared mobile hosts, and fixed mobile hosts.

With this box model, it is possible to examine a scenario and apply an algorithm with a set number of MHs and balance them. For the initial model, a greedy algorithm is used because of its simplicity in solving basic scenarios and its respectable ability to balance each neighbor BS.

The greedy algorithm can be applied to the load balancing problem and utilize a global knowledge of the current load across all N (the number of total BSes) BSes to excel further in performance. The goal of the greedy algorithm is to balance the loads of BS(i) ($i^{th}$ is the current BS chosen) so that two adjacent base stations' fixed loads are equal to or within the range of one BS(i)'s load. A standard deviation is used as a metric to calculate the performance of the greedy algorithm, and the standard deviation can be derived according to the prior art.

The global knowledge can construct a snapshot of the current loads of all N BSes and sort the loads in an ascending order of the number of fixed mobile hosts. The greedy algorithm starts at the initial minimum fixed mobile host count of BS(i) and iterates its way to the final BS(N). When the greedy algorithm is being applied to BS(i), it checks to see if BS(i+1)'s fixed mobile host count is equal to the current BS(i). If it is equal, the BS with the less shared MHs will be chosen.

Once a BS(i) is chosen, the process of gaining one MH from the greater shared MH count is iterated until BS(i) is no longer the minimal fixed BS in the current global load knowledge. If BS(i) has no more sharable MH despite being the minimum current global load, the greedy algorithm skips and considers all the BSes before BS(i) as "balanced." When the greedy algorithm reaches BS(N), the greedy algorithm is finished and has optimized the load.

Figure 3:
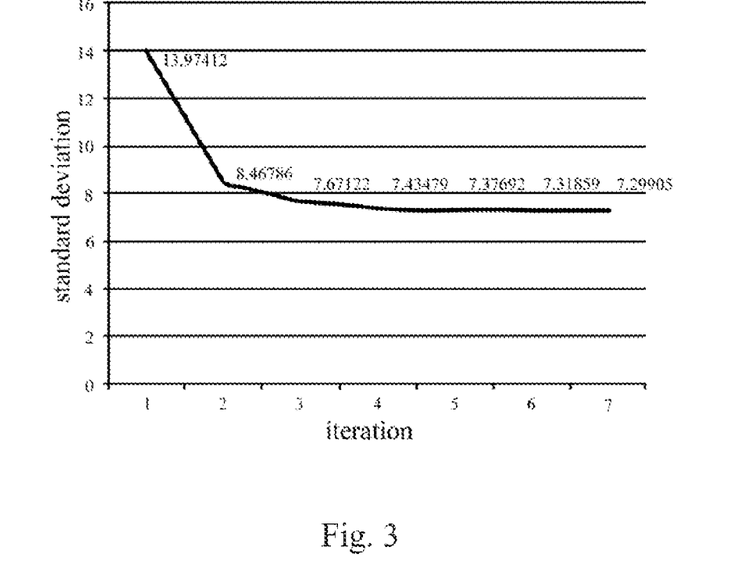
FIG. 3 illustrates a graphical representation of the standard deviation according to an embodiment of the invention.

The greedy algorithm is examined by testing a base case scenario by first creating a one-dimensional graph as illustrated in FIG. 2. The performance of the greedy algorithm was respectable after a single iteration for a small set of N BSes. It is noticed that for test cases with more BSes had an increased optimized load result but with a decreased gain as several iterations of the greedy algorithm was applied as seen in FIG. 3. FIG. 3 illustrates a graphical representation of the standard deviation decreasing on a test of 15 BSes balancing 593 mobile hosts after 7 iterations, where lower standard deviation is better.

2. M-Dimension Box Model and Greedy Approach

Figure 4:
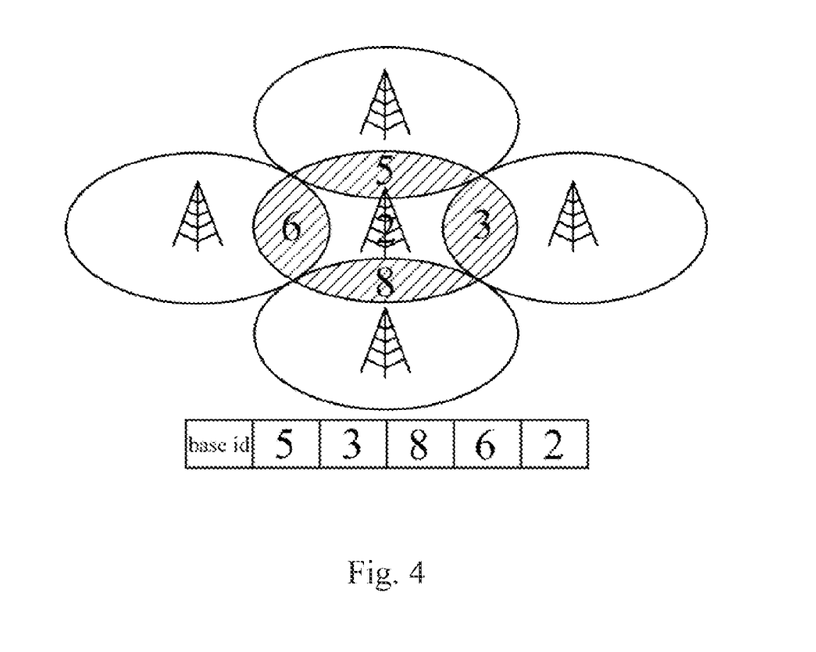
FIG. 4 illustrates a graphical representation of five base stations according to an embodiment of the invention.

The previous box model can be extended to implement a 2-dimensional representation and the greedy algorithm still can be utilized as illustrated in FIG. 4. FIG. 4 illustrates a graphical representation of five BSes, where the number 5, 3, 8, 6 and 2 represent the number of shared MHs within the shared range of the middle BS for the first four numbers and the number of fixed MHs within only the middle BS for the last number, respectively.

The 2-dimensional box model introduces additional conditions for the greedy algorithm, but the greedy algorithm is still applicable to the new box model. The main consequence for a 2-dimensional box model is the additional intersections (shared MHs) that must be calculated per iteration. In the previous section regarding the one-dimensional box model, only two intersections are considered. The new 2-dimensional box model requires now four intersections. Due to the new box model, running more iterations are necessary for a smaller standard deviation.

As a corollary, the box model can continue to accommodate n-dimensions, but will continue to increase the conditional computation by n while increasing the need for more iterations to achieve a smaller standard deviation.

Figure 5:
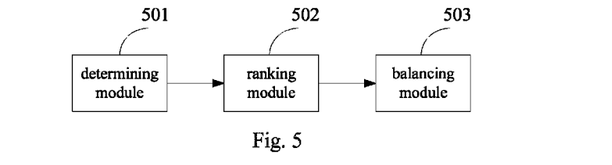
FIG. 5 is a schematic diagram of a load balancing device according to an embodiment of the invention.

Following the foregoing load balancing method, an embodiment of the invention further provides a load balancing device, as illustrated in FIG. 5, the load balancing device includes a determining module 501, a ranking module 502 and a balancing module 503.

The determining module 501 is configured, for each base station, to determine the number of shared mobile hosts shared by the base station with each neighbor base station of the base station and the number of fixed mobile hosts covered only by the base station.

The ranking module 502 is configured to rank all of base stations in an ascending order of the number of fixed mobile hosts.

The balancing module 503 is configured to balance the number of fixed mobile hosts of each base station by applying a greedy algorithm on the ranked base stations.

In an implementation, for each base station, a box model includes an identifier of the base station, the number of shared mobile hosts shared by the base station with each neighbor base station and the number of fixed mobile hosts covered only by the base station.

In an implementation, the balancing module 503 is further configured to, for any one base station of the ranked base stations, determine whether the number of fixed mobile hosts of the one base station is equal to that of the next base station of the ranked base stations; and if the number of fixed mobile hosts of the one base station is less than that of the next base station of the ranked base stations, adjust a part of the shared mobile hosts shared by the one base station with each neighbor base station of the one base station to be fixed mobile hosts of the one base station until the number of fixed mobile hosts of the one base station is no longer the minimal in the ranked base stations; or if the number of fixed mobile hosts of the one base station is equal to that of the next base station of the ranked base stations, choose a base station with the less number of shared mobile hosts between the one base station and the next base station of the ranked base stations, and adjust a part of the shared mobile hosts shared by the chosen base station with each neighbor base station of the chosen base station to be fixed mobile hosts of the chosen base station until the number of fixed mobile hosts of the chosen base station is no longer the minimal in the ranked base stations.

In an implementation, the balancing module 503 is further configured to apply a plurality of iterations of the greedy algorithm on the ranked base stations to reach a predetermined standard deviation.

Figure 6:
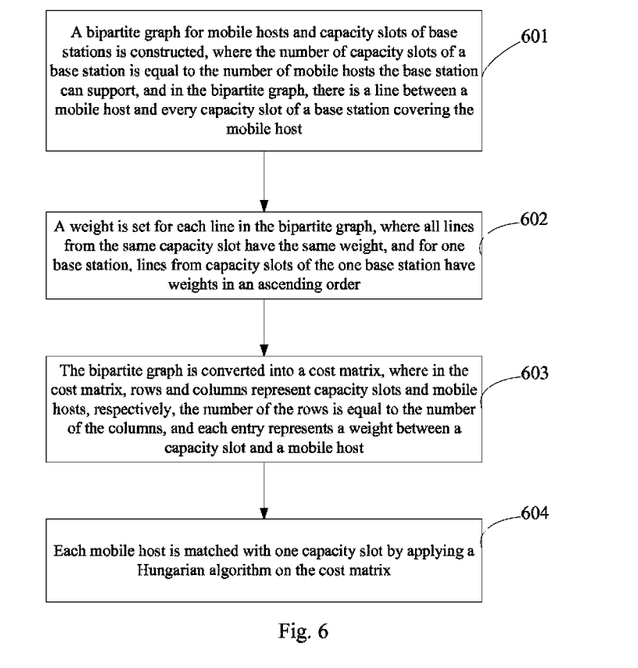
FIG. 6 is a flow chart of a load balancing method according to an embodiment of the invention.

An embodiment of the invention provides another load balancing method, as illustrated in FIG. 6, the load balancing method includes the following steps.

Step 601. A bipartite graph for mobile hosts and capacity slots of base stations is constructed, where the number of capacity slots of a base station is equal to the number of mobile hosts the base station can support, and in the bipartite graph, there is a line between a mobile host and every capacity slot of a base station covering the mobile host.

Step 602. A weight is set for each line in the bipartite graph, where all lines from the same capacity slot have the same weight, and for one base station, lines from capacity slots of the one base station have weights in an ascending order.

Step 603. The bipartite graph is converted into a cost matrix, where in the cost matrix, rows and columns represent capacity slots and mobile hosts, respectively, the number of the rows is equal to the number of the columns, and each entry represents a weight between a capacity slot and a mobile host.

Step 604. Each mobile host is matched with one capacity slot by applying a Hungarian algorithm on the cost matrix.

In an implementation, if the total number of capacity slots is more than the total number of mobile hosts, in the cost matrix, dummy mobile hosts with zero weight columns are added so that the number of the rows is equal to the number of the columns, and if the total number of mobile hosts is more than the total number of capacity slots, in the cost matrix, dummy capacity slots with infinite weight rows are added so that the number of the rows is equal to the number of the columns.

In an implementation, step 604 includes: for each row of the cost matrix, the minimal entry is found and the minimal entry is subtracted from all entries in that row; for each column of the cost matrix, the minimal entry is found and the minimal entry is subtracted from all entries in that column; straight lines are drawn across rows and columns so that all zeros are covered by the straight lines and the number of the straight lines is minimized; and if the number of the straight lines is equal to the size of the cost matrix, each mobile host is matched with one capacity slot according to the resulted cost matrix; otherwise, the smallest entry that is not covered by any straight line is found, the found smallest entry is subtracted from each entry that is not covered by any straight line and is added to each entry that is covered by both a horizontal straight line and a vertical straight line, and additional straight lines are drawn across rows and columns so that all zeros are covered by the straight lines and the number of the straight lines is minimized, until the number of the straight lines is equal to the size of the cost matrix, and then each mobile host is matched with one capacity slot according to the resulted cost matrix.

The above embodiment of the invention will be described in detail by taking some examples below.

3. Load Balancing with a New Bipartite Graph Model

In the former part, the "box" model is used to represent the network scenario, for which the key assumption is that the overlapping area could only involve two base stations, although the box model also can be used when the overlapping area involves more than two base stations, so that the amount of computation can be controlled and it is easier to design a heuristic algorithm, but for a more realistic network scenario, it is modeled as a graph to find an algorithm to solve the load balancing problem.

In this network scenario, given the distribution of base stations, the coverage is represented by circles and there exist intersection areas of two or more circles. Mobile hosts in the overlapping area could be assigned to any base stations involved.

Figure 7:
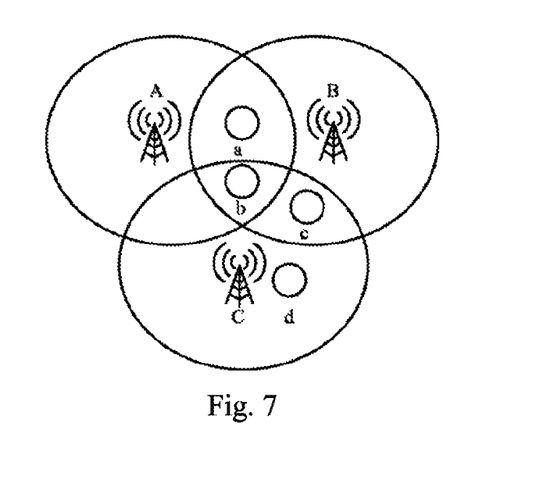
FIG. 7 illustrates a typical basic network scenario according to an embodiment of the invention.

A simple case of that problem is showed in FIG. 7, which illustrates a typical basic network scenario, where there are three base stations (A, B, C) and four mobile hosts (a, b, c, d). Mobile host b in the overlapping area of A, B and C can be assigned to any of A, B and C.

Figure 8:
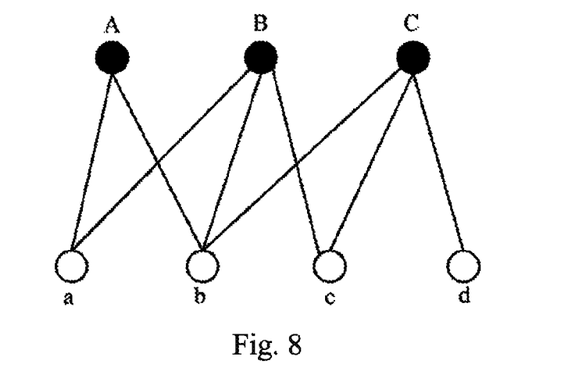
FIG. 8 illustrates a bipartite graph of the network scenario in FIG. 7.

Since the only thing we care is the assignment of mobile host and base station, which in our assumption is only limited by the coverage of base station, the given network scenario in FIG. 7 can be converted into a bipartite graph, as illustrated in FIG. 8. The bipartite graph G=(V, E), where the set of vertices V corresponds to BSes and MHs and the set of edges E corresponds to the coverage of each BS, shows a better representation of real life network scenarios.

There are some existing study in a wireless Local Area Network (LAN), where they try to reach limited load balance that only ensure every MH get served and no base station in the scenario is suffering overloading, by solving max matching problem in this bipartite graph. For the bipartite graph, despite the max matching problem, every edge can be set a weight and there are some algorithm research that can solve min-weight max matching problem, which is to find an assignment that minimize the total weight for all edges in use. However, according to the prior art, no related work has found appropriate weight setting method that could convert the load balancing problem into such minimizing weight assignment problem. Actually, it's hard to do so since the weight is pre-set in the graph and is static, but the load of each base station is dynamic during the assignment. The work mentioned before only set the weight for other purpose such as to maximize the total Received Signal Strength Indicator (RSSI) value of the whole network.

Figure 9:
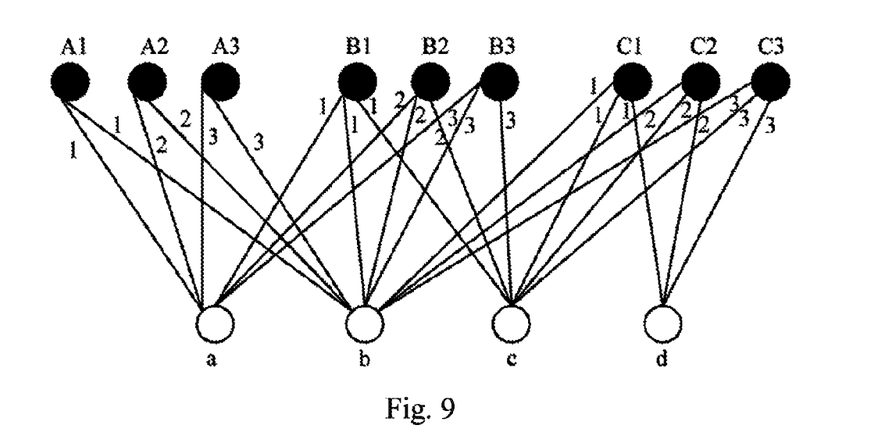
FIG. 9 illustrates a new bipartite graph converted from the bipartite graph in FIG. 8.

Inspired from the former bipartite graph model, a new bipartite graph model is designed which realizes the following transformation: instead of using a vertex to represent the BS itself, BS is divided into C vertices where C represents the capacity of the BS (here the number of mobile hosts the BS can support is used as capacity). Now each of the C vertices represents a capacity slot. All MHs that can connect to that BS now connect with all capacity slots of that base station. Then, the bipartite graph in FIG. 8 is converted into a new bipartite graph as illustrated in FIG. 9 (assume each base station has the capacity of 3).

Now a weight for each edge is set. For all edges from the same capacity slot, their weight is equal. For one BS, the weight of each capacity slot is in an ascending order, e.g, in FIG. 9, the weight of the edges from A1 to all connected MHs is 1, the weight of the edges from A2 to all connected MHs is 2, the weight of the edges from A3 to all connected MHs is 3, etc. Also, one capacity slot can only be assigned to one MH. Using this model, we can convert the even-load problem into finding the assignment to minimize the total sum of the weight of the edges involved.

Figure 10:
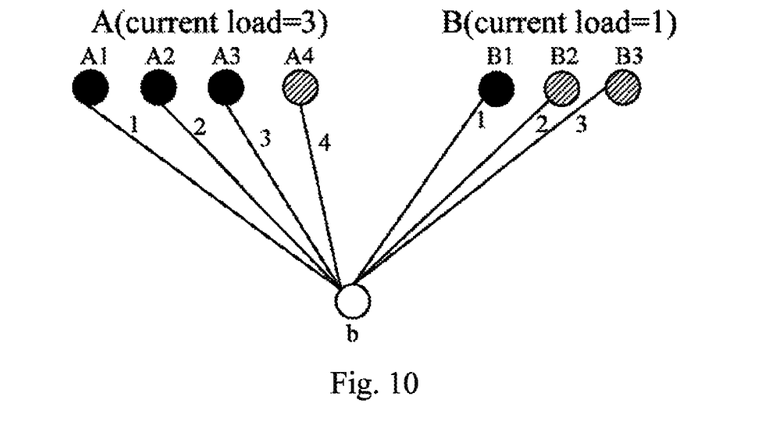
FIG. 10 illustrates an example of a mobile host assignment process according to an embodiment of the invention.

An example in FIG. 10 is used to illustrate the idea. One mobile host b can both connect to a base station A and a base station B. In the assigning process, after several assignments, for the time for the MH b to be assigned, the current load of the base station A is 3 representing a higher load and the BS B's load is 1. Since every assignment seek for a minimum total weight sum, the capacity slots with lower cost will first be occupied. So for the base station A with load 3, the capacity slots with cost 1, 2, 3 (as A1, A2, A3 in FIG. 10) have already been assigned. If the MH b still wants to connect to the BS A, it has to link with A4 with a cost of 4. On the other hand, due to the same reason, if the MH b wants to connect to the BS B with load as only 1, it can take B2 with cost 2. Driven by finding the minimum total cost matching, the MH b will choose B2, that is, connect to the base station B.

The former example shows how finding the minimum weight MH-capacity slot association can lead to the even-load of each base station. In fact, in the assigning process, the weight of edges from currently available unassigned capacity slot represent current load of the base station the capacity slot belongs to. With a view of BS level, it can be seen that in the new bipartite graph, the cost for an MH to connect with a BS is dynamically changing according to its load during the assigning process. The higher load one BS serves, the higher cost for a new MH to connect to that base station. Therefore, to reach the minimum total cost is equal to finding the most balance association.

To solve such minimum weight perfect matching problem, the bipartite graph may be converted into a cost matrix and a Hungarian Algorithm may be used to solve the cost matrix, which can be solved in polynomial time. The input to the Hungarian algorithm is the cost matrix, where the rows are represented by the capacity slots and the columns are represented by the MHs. Each corresponding entry is the weight between the capacity slot and the MH.

The output of the Hungarian algorithm is an assignment list in which one mobile host is matched to only and exactly one capacity slot and no mobile host or capacity slot left unmatched (exposed) whereas keeping the total cost of the solution minimum (a characteristic of minimum weighted perfect matching). The Hungarian algorithm attempts to find an optimized solution in each step by trying different combinations between unmatched and matched capacity slots.

The entries of the cost matrix represent the weight between a capacity slot and a mobile host. Rows represent the capacity slots and columns represent the mobile hosts. Accordingly, two main problems are experienced.

1. A cost matrix should have values for all entries. In a situation where a MH is out of the range of a base station, a value for the corresponding entry of the pair in the input cost matrix shall be set. Those entries will be filled with infinite values. Since every entry represents a possible connection between the mobile host and the base station (as a part of the assignment solution), an assignment where that specific entry is included in the final match is undesired.

2. The Hungarian algorithm receives a square cost matrix to ensure 1-1 matching. But in real life scenarios, the input cost matrix might not be square (i.e. the number of mobile hosts is less than the number of capacity slots or vice versa). In this situation, the dummy nodes solution is introduced to make the input a square cost matrix.

If the total number of capacity slots is more than the total number of mobile hosts, dummy mobile hosts (with zero weight columns) are added to make the cost matrix square. If the total number of mobile hosts is more than the total number of capacity slots, dummy capacity slots with infinite weight rows are added so that the cost matrix is square.

Figure 11A:
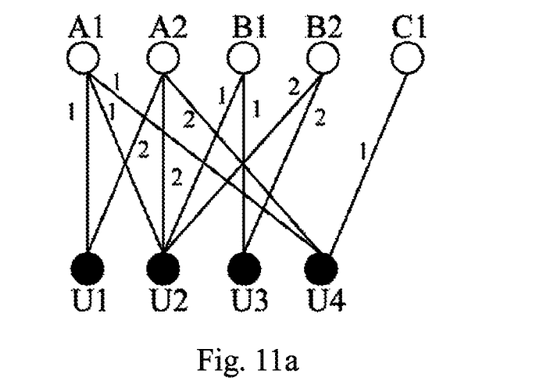
FIG. 11a illustrates a network model with 5 capacity slots and 4 mobile hosts according to an embodiment of the invention.
Figure 11B:
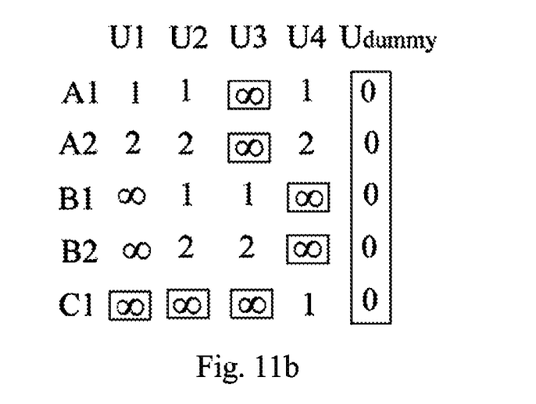
FIG. 11b illustrates a cost matrix of the network model in FIG. 11a according to an embodiment of the invention.

For example, FIG. 11a illustrates a network model with 5 capacity slots and 4 mobile hosts, and FIG. 11b illustrates a cost matrix, conversion of the network model in FIG. 11a with a dummy mobile host and zero entries added.

Assume that there are N capacity slots and N mobile hosts. For each possible BS-MH pair there is a cost C to establish a link in between.

$\{C_{i,j}\}_{N \times N}$ is the cost matrix where $C_{i,j}$ is the cost a capacity slot i charges a mobile host j.

$\{R_{i,j}\}_{N \times N}$ is the result where $R_{i,j}=1$ if the $i^{th}$ capacity slot is assigned to $j^{th}$ mobile host.

$\Sigma_{j=1} R_{i,j}=1$, $\forall i \in [1, \ldots, N]$ is one capacity slot to one mobile host.

$\Sigma_{i=1} R_{i,j}=1$, $\forall j \in [1, \ldots, N]$ is one mobile host to one capacity slot.

$\Sigma_{i=1} \Sigma_{j=1} C_{i,j} R_{i,j} \rightarrow$ min is total cost function that the algorithm uses.

Considering the cost matrix $\{C_{i,j}\}_{N \times N}$ derived in the assignment problem, follow the next steps for the optimal assignment.

1. For each capacity slot, i.e., each row of the cost matrix, find the minimal cost entry and subtract it from all entries in that row.

2. For each mobile host (i.e., each column of the cost matrix), find the minimal cost entry and subtract it from all entries in that column.

3. Draw lines across rows and columns so that (1) all zeros are covered by the lines, and (2) the number of lines is minimized.

3a. If the minimum number of lines is equal to the size of the cost matrix, go to step 5 for the optimal assignment solution.

3b. Otherwise, find the smallest entry that is not covered by any of the lines. That is, assume V is the set of lines (rows and columns) in above step 3a, set $$\theta = \min(C_{i,j}) \atop i \notin V \text{ and } j \notin V.$$

3c. Subtract the smallest entry found in step 3b from each entry that is not covered by any of the lines, and add the smallest entry found in step 3b to each entry that is covered by both a horizontal line and a vertical line. That is, adjust the cost matrix as:

$$C_{i,j} = \begin{cases} C_{i,j} - \theta, & i \notin V \text{ and } j \notin V \\ C_{i,j} + \theta, & i \in V \text{ and } j \in V \\ C_{i,j}, & \text{otherwise.} \end{cases}$$

4. Repeat step 3 until the minimum number of lines is equal to the size of the matrix.

5. Find a feasible assignment from the resulted cost matrix, it is then the optimal solution to the assignment (the zeros in the cost matrix).

The case illustrated in FIGS. 11a and 11b is taken as an example. First, steps 1 and 2 are applied to the cost matrix and get a matrix as illustrated in FIG. 12.

Figure 12:
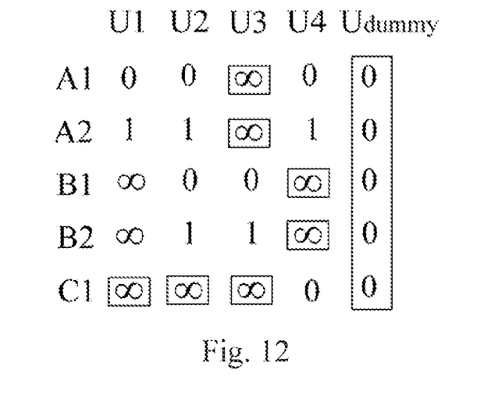
FIG. 12 illustrates a cost matrix derived from FIG. 11b according to an embodiment of the invention.
Figure 13:
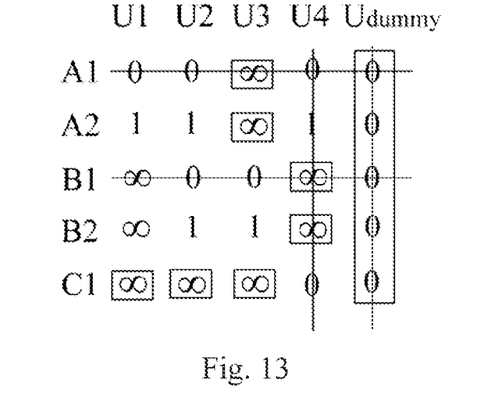
FIG. 13 illustrates the cost matrix in FIG. 12 with drawn lines according to an embodiment of the invention.

Then step 3 is applied to the matrix in FIG. 12, and FIG. 13 is derived.

Figure 14:
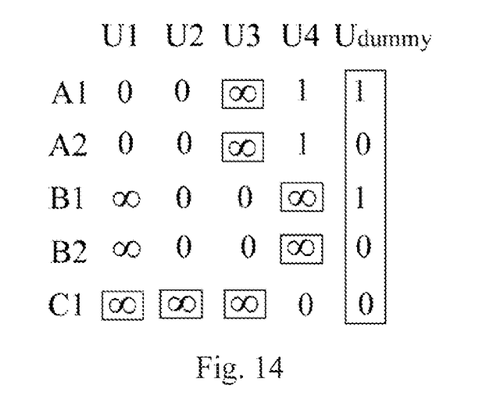
FIG. 14 illustrates a cost matrix derived from FIG. 12.

Since the number of lines (4) is less than the dimension of the cost matrix, steps 3b and 3c are applied to adjust the entries. The resulting matrix is as illustrated in FIG. 14.

Figure 15:
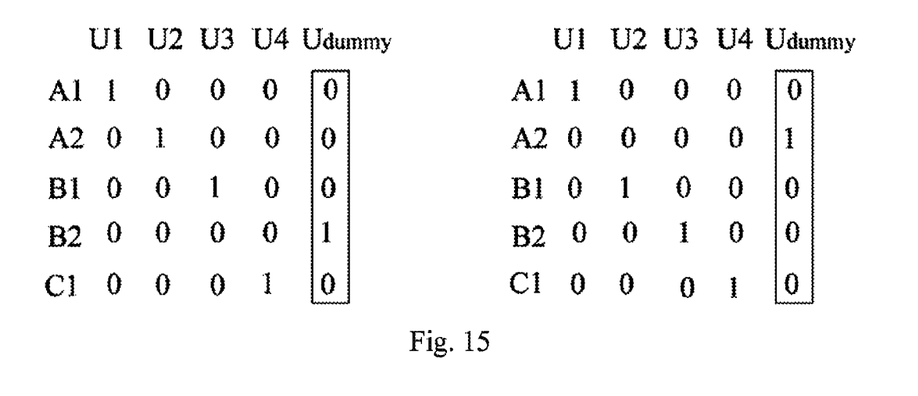
FIG. 15 illustrates two feasible assignment matrices according to an embodiment of the invention.

All the zero entries cannot be covered with less than 5 lines. Therefore, the optimal assignment is in the above resulted cost matrix. Every zero entry marks a possible assignment that leads to the optimal assignment. Two feasible assignments can be found, with the assignment matrix $\{R_{i,j}\}_{N \times N}$ as illustrated in FIG. 15. Both of them are optimal balanced assignments between {A1, A2, B1, B2, C} and {U1, U2, U3, U4}.

Figure 16:
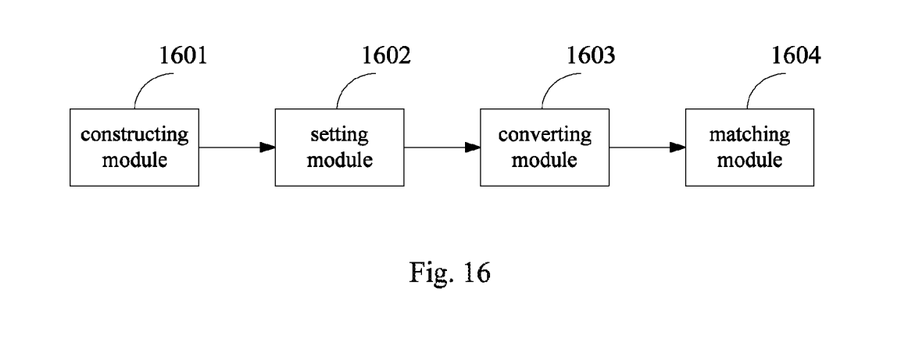
FIG. 16 is a schematic diagram of a load balancing device according to an embodiment of the invention.

Following the foregoing load balancing method, an embodiment of the invention further provides a load balancing device, as illustrated in FIG. 16, the load balancing device includes a constructing module 1601, a setting module 1602, a converting module 1603 and a matching module 1604.

The constructing module 1601 is configured to construct a bipartite graph for mobile hosts and capacity slots of base stations, wherein the number of capacity slots of a base station is equal to the number of mobile hosts the base station can support, and in the bipartite graph, there is a line between a mobile host and every capacity slot of a base station covering the mobile host.

The setting module 1602 is configured to set a weight for each line in the bipartite graph, wherein all lines from the same capacity slot have the same weight, and for one base station, lines from capacity slots of the one base station have weights in an ascending order.

The converting module 1603 is configured to convert the bipartite graph into a cost matrix, wherein in the cost matrix, rows and columns represent capacity slots and mobile hosts, respectively, the number of the rows is equal to the number of the columns, and each entry represents a weight between a capacity slot and a mobile host.

The matching module 1604 is configured to match each mobile host with one capacity slot by applying a Hungarian algorithm on the cost matrix.

In an implementation, if the total number of capacity slots is more than the total number of mobile hosts, in the cost matrix, dummy mobile hosts with zero weight columns are added so that the number of the rows is equal to the number of the columns, and if the total number of mobile hosts is more than the total number of capacity slots, in the cost matrix, dummy capacity slots with infinite weight rows are added so that the number of the rows is equal to the number of the columns.

In an implementation, the matching module 1604 is further configured to, for each row of the cost matrix, find the minimal entry and subtract the minimal entry from all entries in that row; for each column of the cost matrix, find the minimal entry and subtract the minimal entry from all entries in that column; draw straight lines across rows and columns so that all zeros are covered by the straight lines and the number of the straight lines is minimized; and if the number of the straight lines is equal to the size of the cost matrix, match each mobile host with one capacity slot according to the resulted cost matrix; otherwise, find the smallest entry that is not covered by any straight line, subtract the found smallest entry from each entry that is not covered by any straight line, add the found smallest entry to each entry that is covered by both a horizontal straight line and a vertical straight line, and draw additional straight lines across rows and columns so that all zeros are covered by the straight lines and the number of the straight lines is minimized, until the number of the straight lines is equal to the size of the cost matrix, and then match each mobile host with one capacity slot according to the resulted cost matrix.

Existing solutions, including cell-breathing, channel borrowing, or dynamic scheduling mostly focused on local optimization problem which only takes the neighbor base stations into consideration when making the load-balancing decision. The embodiments of the invention take full advantage of the new C-RAN architecture where centralized processing, cooperative radio, and Cloud infrastructure Radio Access Network is made possible. With global knowledge of the network load and the MH-BS association, it is possible to quickly and efficiently calculate global optimal load balancing solutions while reducing the cost of deriving such solutions. The embodiments of the invention also converge much faster than a distributed load balancing solution, and are immune from the stability problem.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore, the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable data processing device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

The invention claimed is:

1. A load balancing method, comprising:
constructing a bipartite graph for mobile hosts and capacity slots of base stations, wherein a number of the capacity slots of a base station is equal to a number of the mobile hosts the base station supports, and in the bipartite graph, there is a line between a mobile host and every capacity slot of the base station covering the mobile host;
setting a weight for each line in the bipartite graph, wherein all lines from same capacity slot have same weight, and for one base station, lines from the capacity slots of the one base station have weights in an ascending order;
converting the bipartite graph into a cost matrix, wherein in the cost matrix, rows and columns represent the capacity slots and the mobile hosts, respectively, a number of the rows is equal to a number of the columns, and each entry represents a weight between the capacity slot and the mobile host; and
matching each mobile host with one capacity slot by applying a Hungarian algorithm on the cost matrix, wherein matching the each mobile host with the one capacity slot by applying the Hungarian algorithm on the cost matrix comprises:
for each row of the cost matrix, finding a first minimal entry and subtracting the first minimal entry from all entries in that row;
for each column of the cost matrix, finding a second minimal entry and subtracting the second minimal entry from all entries in that column;
drawing straight lines across rows and columns so that all zeros are covered by the straight lines and the number of the straight lines is minimized; and when the number of the straight lines is equal to the size of the cost matrix, matching the each mobile host with the one capacity slot according to resulted cost matrix; otherwise, finding a smallest entry that is not covered by any straight line, subtracting the found smallest entry from each entry that is not covered by the any straight line, adding the found smallest entry to each entry that is covered by both a horizontal straight line and a vertical straight line, and drawing additional straight lines across the rows and the columns so that the all zeros are covered by the straight lines and the number of the straight lines is minimized, until the number of the straight lines is equal to the size of the cost matrix, and then matching the each mobile host with the one capacity slot according to the resulted cost matrix.

2. The load balancing method of claim 1, wherein when a total number of the capacity slots is more than a total number of the mobile hosts, in the cost matrix, dummy mobile hosts with zero weight columns are added so that the number of the rows is equal to the number of the columns, and when the total number of the mobile hosts is more than the total number of the capacity slots, in the cost matrix, dummy capacity slots with infinite weight rows are added so that the number of the rows is equal to the number of the columns.

3. A load balancing device, comprising:
a constructing hardware module, configured to construct a bipartite graph for mobile hosts and capacity slots of base stations, wherein a number of the capacity slots of a base station is equal to a number of the mobile hosts the base station supports, and in the bipartite graph, there is a line between a mobile host and every capacity slot of the base station covering the mobile host;
a setting hardware module, configured to set a weight for each line in the bipartite graph, wherein all lines from same capacity slot have same weight, and for one base station, lines from the capacity slots of the one base station have weights in an ascending order;
a converting hardware module, configured to convert the bipartite graph into a cost matrix, wherein in the cost matrix, rows and columns represent the capacity slots and the mobile hosts, respectively, a number of the rows is equal to a number of the columns, and each entry represents a weight between the capacity slot and the mobile host; and
a matching hardware module, configured to match each mobile host with one capacity slot by applying a Hungarian algorithm on the cost matrix, wherein the matching hardware module is further configured to:
for each row of the cost matrix, find a first minimal entry and subtract the first minimal entry from all entries in that row;
for each column of the cost matrix, find a second minimal entry and subtract the second minimal entry from all entries in that column;
draw straight lines across the rows and the columns so that all zeros are covered by the straight lines and the number of the straight lines is minimized; and
when the number of the straight lines is equal to the size of the cost matrix, match the each mobile host with the one capacity slot according to resulted cost matrix; otherwise, find a smallest entry that is not covered by any straight line, subtract the found smallest entry from each entry that is not covered by any straight line, add the found smallest entry to the each entry that is covered by both a horizontal straight line and a vertical straight line, and draw additional straight lines across the rows and the columns so that the all zeros are covered by the straight lines and the number of the straight lines is minimized, until the number of the straight lines is equal to the size of the cost matrix, and then match the each mobile host with the one capacity slot according to the resulted cost matrix.

4. The load balancing device of claim 3, wherein when a total number of the capacity slots is more than a total number of the mobile hosts, in the cost matrix, dummy mobile hosts with zero weight columns are added so that the number of the rows is equal to the number of the columns, and when the total number of the mobile hosts is more than the total number of the capacity slots, in the cost matrix, dummy capacity slots with infinite weight rows are added so that the number of the rows is equal to the number of the columns.

\* \* \* \* \*